United States Patent [19]
Morimoto et al.

[11] Patent Number: 6,067,500
[45] Date of Patent: *May 23, 2000

[54] NAVIGATION SYSTEM

[75] Inventors: Kyomi Morimoto; Mitsuhiro Nimura; Yasunobu Ito, all of Anjo, Japan

[73] Assignee: Aisin Aw Co., Ltd., Anjo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/685,621

[22] Filed: Jul. 24, 1996

[30] Foreign Application Priority Data

Aug. 14, 1995 [JP] Japan ................... 7-206863
Sep. 27, 1995 [JP] Japan ................... 7-249226

[51] Int. Cl.⁷ .................. G06G 7/78; G08G 1/123
[52] U.S. Cl. .................. 701/209; 701/208; 701/210; 701/211; 340/988; 340/990; 340/995; 73/178 R
[58] Field of Search .................. 701/200, 201, 701/208, 209, 210, 211, 212, 202, 23, 24, 25, 26, 213; 340/460, 988, 990, 995; 73/178 R; 709/100; 711/103

[56] References Cited

U.S. PATENT DOCUMENTS

| | | | |
|---|---|---|---|
| 3,652,836 | 3/1972 | Richardson et al. | 701/203 |
| 4,796,189 | 1/1989 | Nakayama et al. | 701/209 |
| 4,939,661 | 7/1990 | Barker et al. | 701/200 |
| 5,262,775 | 11/1993 | Tamai et al. | 701/210 |
| 5,291,412 | 3/1994 | Tamai et al. | 701/211 |
| 5,291,413 | 3/1994 | Tamai et al. | 701/210 |
| 5,293,163 | 3/1994 | Kakihara et al. | 701/208 |
| 5,365,448 | 11/1994 | Nobe et al. | 701/208 |
| 5,400,254 | 3/1995 | Fujita | 701/213 |
| 5,432,937 | 7/1995 | Tevanian et al. | 395/712 |
| 5,537,324 | 7/1996 | Nimura et al. | 701/208 |
| 5,544,061 | 8/1996 | Morimoto et al. | 701/202 |
| 5,544,087 | 8/1996 | Nakajima et al. | 701/200 |
| 5,614,895 | 3/1997 | Ohomori et al. | 701/208 |
| 5,652,706 | 7/1997 | Morimoto et al. | 701/210 |
| 5,712,632 | 1/1998 | Nishimura et al. | 701/201 |
| 5,850,193 | 12/1998 | Shimoura et al. | 701/210 |
| 5,874,905 | 2/1999 | Nanba et al. | 701/211 |
| 5,890,088 | 3/1999 | Nimura et al. | 701/208 |
| 5,893,113 | 4/1999 | McGrath et al. | 701/208 |
| 5,899,956 | 5/1999 | Chan | 701/213 |

FOREIGN PATENT DOCUMENTS

| | | |
|---|---|---|
| 0 449 530 A2 | 10/1991 | European Pat. Off. . |
| 0-449-530 | 10/1991 | European Pat. Off. . |
| 0 627 612 A1 | 12/1994 | European Pat. Off. . |
| 0-627-612 | 12/1994 | European Pat. Off. . |
| 57-41739A | 3/1982 | Japan . |

OTHER PUBLICATIONS

Alegiani J.B. et al.: "An In-Vehicle Navigation and Information System Utilizing Defined Software Services" Proceedings of the Vehicle Navigation and Information Systems Conference. (VNIS), Toronto, Sep. 11–13, 1989, No. Conf. 1, Sep. 11, 1989, pp. A03–A08.

Patent Abstract of Japan, Publication No. 57–041739A, Mar. 9, 1982.

Alegiani J B et al., "An In-Vehicle Navigation and Information System Utilizing Defined Software Services", Proceedings of the Vehicle Navigation and Information Systems Conference (VNIS), Toronto, Sep. 11–13, 1989, No. Conf. 1, Sep. 11, 1989, Reeki D; Case E; Tsai J, pp. A03–A08.

*Primary Examiner*—Jacques H. Louis-Jacques
*Attorney, Agent, or Firm*—Oliff & Berridge, Plc

[57] ABSTRACT

An external storage device having navigation data and programs stored therein to perform a route search and provide route guidance, and a central processing unit which includes a program storage flash memory and program loading means for loading programs from the external storage device into the flash memory. The programs stored in the flash memory are run to perform a route search and provide route guidance. The central processing unit compares a version of each program stored in flash memory with a version of the program stored in external storage device, so that when the version of the program stored in the external storage device is more current than that stored in the flash memory, the program is loaded from the external storage device into the flash memory.

19 Claims, 10 Drawing Sheets

FIG. 1   Prior Art
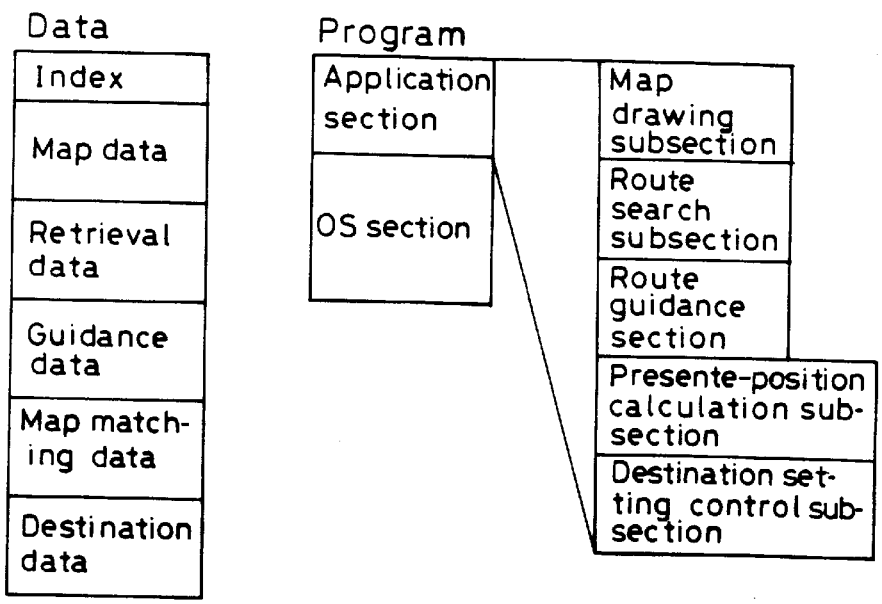
FIG. 2A   Prior Art
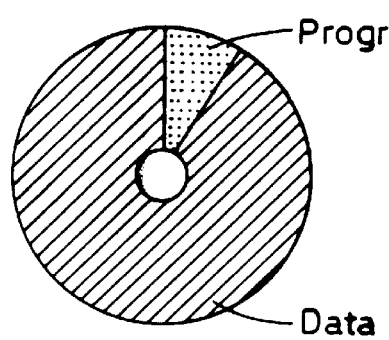
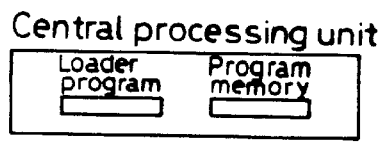
FIG. 2B   Prior Art
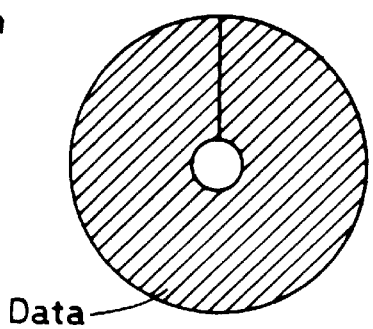
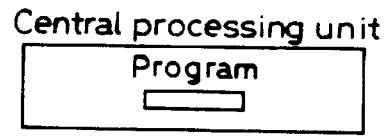

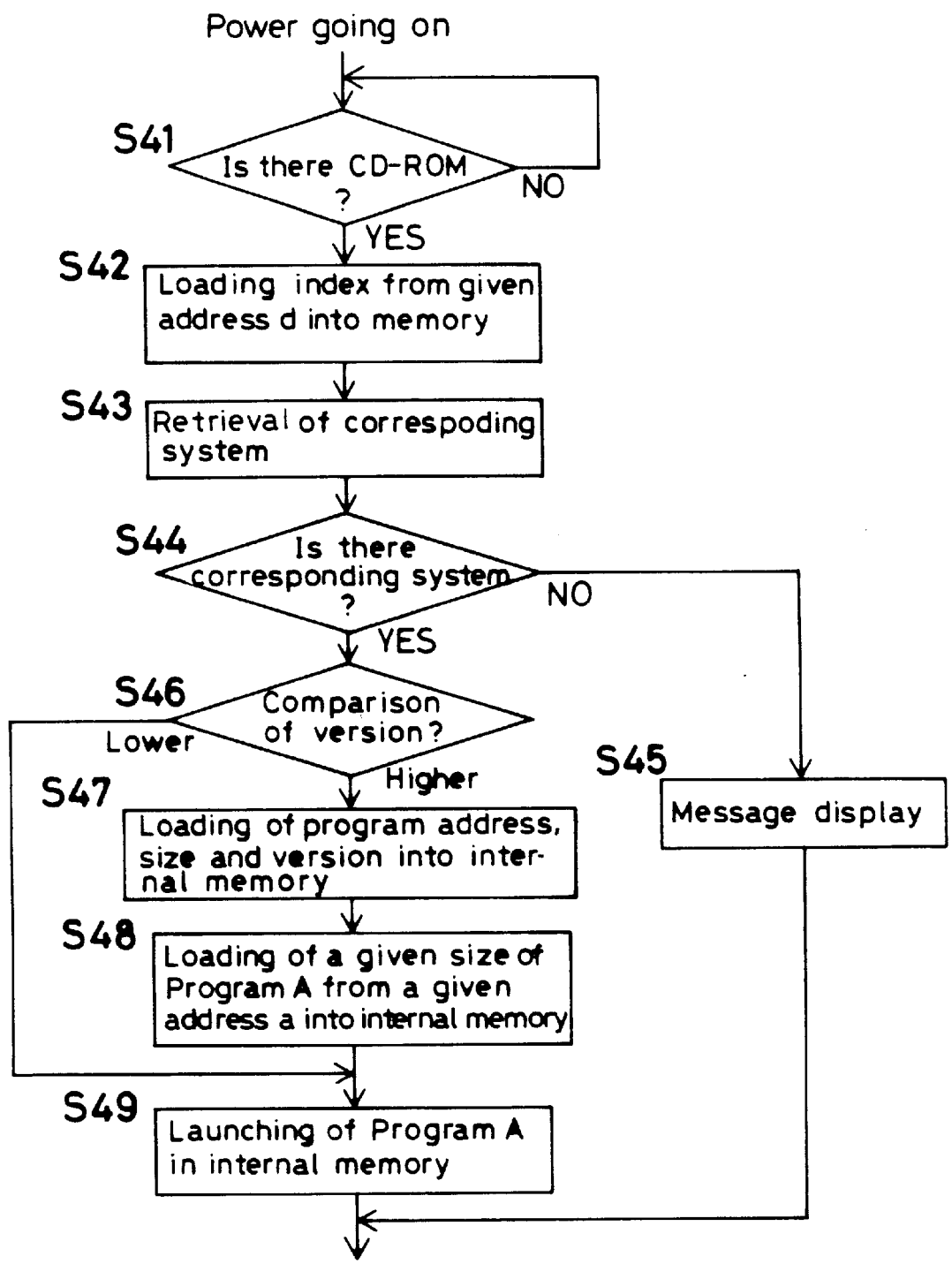

NAVIGATION SYSTEM

BACKGROUND OF THE INVENTION

The invention relates to a navigation system for making a route search to preset destinations, thereby providing route guidance.

Various navigation systems have been proposed to implement route guidance from departure or current position to any desired destination via transit points using screen displays and voice. As is well known in the art, a typical vehicular navigation system is made up of an information storage device in which there is stored map data, guidance data for achieving route guidance, provided to the operator, as to geometrical features of intersecting points and locations to be passed by, using screen displays and voice. By inputting the transit point(s) and destination, thereby providing route instructions, a route to the destination is identified (route search). For this reason, the vehicular navigation system includes an input/output device for inputting and outputting information about route guidance, a present-position sensing device for sensing the present position of the vehicle, an information storage device in which there is recorded the navigation data required for route calculation, and image and voice guidance data needed for route guidance, and a central processing unit for performing search processing and the image guidance processing needed for providing route guidance as well as for performing control of the overall system.

In general, the information storage device is a database which, as shown in FIG. 1 for example, comprises files such as an index, map data, search data, guidance data, map matching data, and destination data, with all the data needed for a navigation system recorded therein. CD-ROMs are often used as practical storage media. The device also has an application section including navigation programs, such as a map drawing subsection (a map drawing program), a route search subsection (a route search program), a route guidance subsection (a route guidance program), a present-position calculation subsection (a present-position calculation program) and a destination setting operation control subsection (a destination setting operation control program), and an operating system (OS) section. Given processing is performed using map data by the map drawing subsection, search data by the route search subsection, guidance data by the route guidance subsection, map matching data by the present-position calculation subsection, and destination data by the destination setting operation control subsection. It is here to be noted that at the present-position calculation subsection the calculation of the present position is performed using map data; that is, if the map data is used not only at the map drawing subsection but at the present position calculation subsection as well, it is then possible to dispense with the map matching data, thereby reducing the quantity of data required.

At the present-position calculation subsection, direction information and distance information obtained in the form of signals from a relative direction sensor, an absolute direction sensor and a distance sensor are collated with the map data or map matching data to detect the present position. Given instructions for input of the intended point, such as the destination and route search, the route search subsection uses the search data to make a search to find out the optimum route to the destination. Upon the startup of guidance following this, the route guidance subsection displays a map indicating in what direction the vehicle is to run from the present position, for instance. At the same time, the guidance data is used according to the identified route to output, in the form of screen displays and voice, a variety of information about intersecting points, geometrical features of locations to be passed by, distances to transit points, and in what direction the vehicle is to turn at an intersecting point.

A conventional vehicular navigation system is generally broken down into two types in terms of the manner of storing programs and data for performing the route search and developing the route guidance. In one type, as shown in FIG. 2B, only the data is stored in a CD-ROM while applications and OS programs are done in a central processing unit. In another type, as shown in FIG. 2A, programs and data are stored in the CD-ROM, and are then sequentially loaded into a program memory space located in the central processing unit.

However, the system of the type having both the navigation programs and map data stored in the CD-ROM, wherein, upon launching, the navigation programs are loaded into the program memory space for the purpose of running them, takes much more time to start up or launch, when compared with the system of the type having navigation programs stored in the central processing unit because, whenever the system is launched, the navigation programs must be loaded into the program memory space.

All these known navigation systems have programs and data of their own, and so are designed to perform a route search and route guidance of their own. For this reason, they are sophisticatedly different from each other not only in terms of the route search algorithm and its results, but also in terms of how to achieve the route guidance as well. For instance, differences are apparent in how maps are displayed and present positions are expressed, screen displays, voice information, and the timing of intersecting points and geographical features. It is, thus, always required for a supplier to provide a central processing unit and CD-ROM in a set-up form. Once a user has purchased a certain system, as set up by a certain maker, on the other hand, it is always required for the user to use CD-ROMs made to the specifications of that maker, i.e. compatible CD-ROMs. For example, in a system A, composed of a CD-ROM with program A and data A stored therein and a central processing unit, services rendered to the user are simply those of making use of the concepts behind a route search and route guidance in a specific system A. In other words, CD-ROM with program B and data B stored therein cannot be separated from a system B and the CD-ROM used with a central processing unit for running on the system A that is conceptually different from the system B even though the product, a specified route, is substantially the same. To update or complete maps, early users have to wait for software makers to develop appropriate applications, and if updated applications are not available to the users in the system they have, they must somehow replace their existing central processing unit and CD-ROM with a system having more current data and/or programs/applications.

SUMMARY OF THE INVENTION

One object of the invention is to provide a navigation system which dispenses with extravagant operations when the power is turned on to reduce the time needed for launching a CD-ROM, so that the CD-ROM can be launched rapidly. Another object of the invention is to provide a navigation system which enables CD-ROMs used on similar other systems to be selectively used therewith.

According to one aspect of the invention, there is provided a navigation system designed to perform a route search to a destination and route guidance, which comprises an external storage device in which navigation data, the program for performing the route search, and the route guidance have been stored, and a central processing unit for running the program, thereby performing route search and guidance processing on the basis of the data, wherein the central processing unit includes nonvolatile memory means for storing the program and program loading means for loading the program from the external storage device into the nonvolatile memory means, the program loaded from the external storage device into the nonvolatile memory means being run, and the program loading means being designed to check an update number of the program so that when the update number is older in the external storage means than in the nonvolatile memory means, a classification number of the program is checked, and when the classification number differs between the external storage device and the nonvolatile memory means, the nonvolatile memory means is updated.

According to another aspect of the invention, there is provided a navigation system designed to perform a route search to a destination and provide route guidance, which comprises an external storage device in which navigation data and a plurality of programs for performing the route search and providing the guidance have been stored, and a central processing unit for running the programs, thereby performing processing for route search and guidance on the basis of the data, wherein the central processing unit includes nonvolatile memory means for storing the programs and the program loading means for loading the programs from the external storage device into the nonvolatile storage means, so that the programs loaded from the external storage device into the nonvolatile storage means can be run.

According to yet another aspect of the invention, there is provided a memory medium used on a navigation system, designed to perform a route search to a preset destination and provide route guidance, in which there are stored navigation data and a plurality of programs for performing the route search to the preset destination and provide route guidance, Still other objects and advantages of the invention will in part be obvious and will in part be apparent from the specification.

The invention accordingly comprises the features of structure, combinations of elements, and arrangement of parts which will be exemplified in the structure hereinafter set forth, and the scope of the invention will be indicated in the claims.

BRIEF DESCRIPTION OF THE DRAWINGS

The invention will be described with reference to the figures in which:

FIG. 1 shows an exemplary structure of navigation data and program;

FIGS. 2A–2B are views showing how information is stored in a CD-ROM used on conventional vehicular navigation systems;

FIG. 8 is a block diagram illustrating the flow of processing on a loader program;

DESCRIPTION OF PREFERRED EMBODIMENTS

Figure 3:
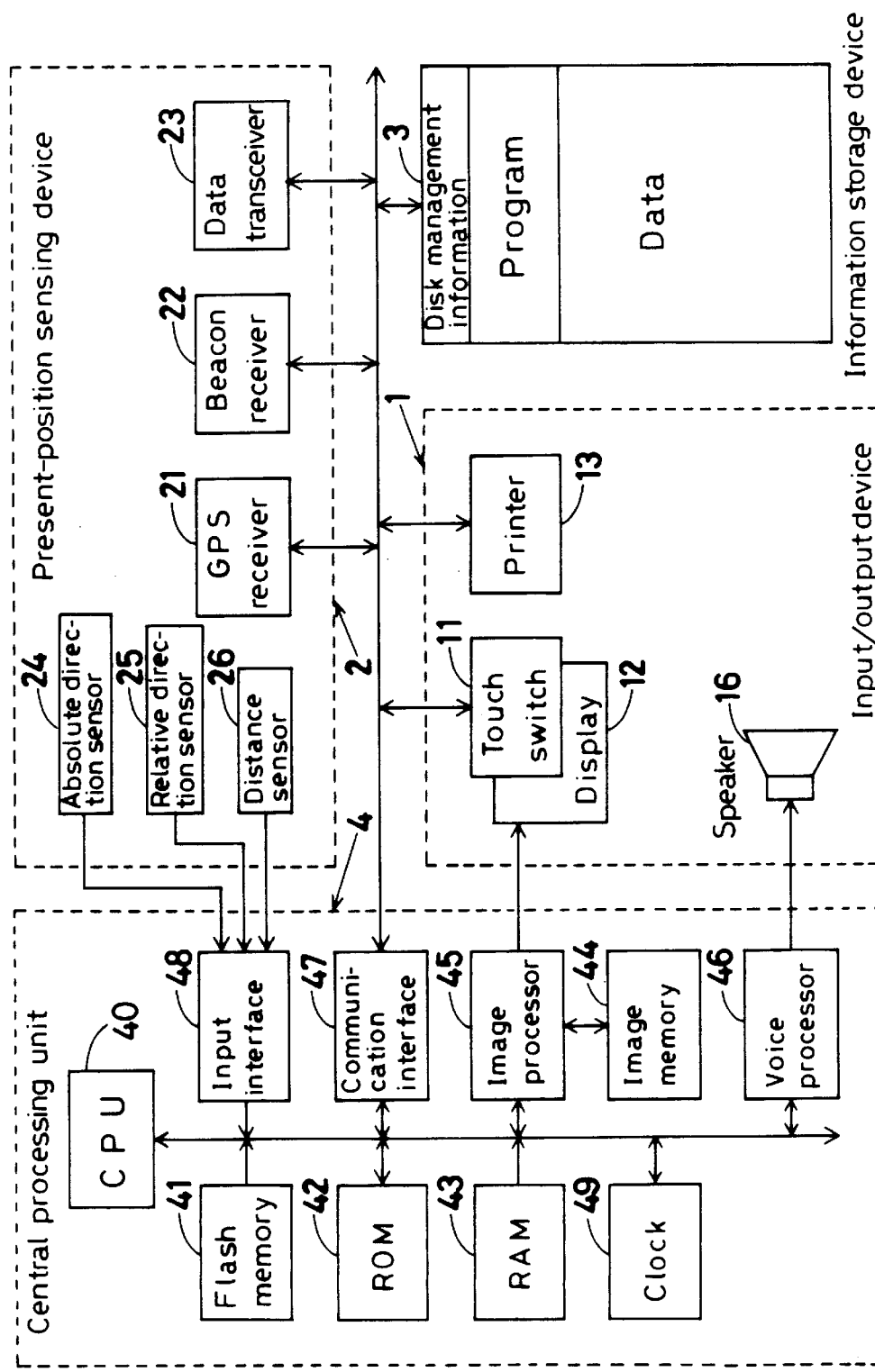
FIG. 3 is a block diagram showing one embodiment of a vehicular navigation system to which the invention is applied.

As shown in FIG. 3, a vehicular navigation system according to the invention comprises an input/output unit 1 for input/output of information about route guidance, a present-position sensing device 2 for sensing information about the present position of an automotive vehicle, an information storage device 3 in which the navigation data necessary for route calculation and the screen display/voice guidance data necessary for route guidance, and a plurality of different types of programs (applications and/or OS) have been recorded, and a central processing unit 4 for executing route finding processing, the screen display/voice guidance processing necessary for a route search and providing route guidance, and for control of the overall system.

The input/output unit 1 functions to enter designations, to allow a driver to instruct the central processing unit 4, at the volition of the driver, to execute navigation processing in such a manner that guidance information can be output by voice and/or a screen display when required by the driver, and to print out processed data. As means for implementing these functions, an input section of the input/output unit has a touch switch 11 or other operating switch for entering a designation in the form of a telephone number or coordinates on a map, and for requesting route guidance. As a matter of course in this case, an input device, such as a remote control device, can be used to this end. An output section has a display 12 for displaying input data on a screen and, moreover, for automatically displaying route guidance on the screen in response to a request from the driver, a printer 13 for printing out data processed by the central processing unit 4 and stored in the information storage device 3, and a speaker 16 for outputting route guidance by voice.

It is to be understood that a voice recognition device may be provided which enables voice input and or a card reader for reading data recorded on an IC card or magnetic card. It is also to be noted that in addition to these input means, provision may be made for a data communication device which exchanges data between an information center, which enables the data needed for navigation to be stored therein, and provided to a driver on demand via a communication line and an information source such as an electronic notebook with data specific to a driver, for instance, a map or destination data previously stored therein.

The display 12 is a color CRT or color liquid-crystal display device. On the basis of the map data and the guidance data processed by the central processing unit 4, the display 12 outputs, as a color display, all screens necessary for navigation, such as a route setting screen, a screen of an interval view and a screen of intersections. The display 12, functioning as a touch screen, also has display buttons, for setting a desired route and for changing over the route guidance presentation (voice and visual or visual only) and screen characteristics, such as scale during the route instruction. In particular, transit-intersection information, such as the names of intersections to be traversed, is displayed in color in the form of a pop-up menu as part of the interval view during transit.

The display 12 is located within an instrument panel in the vicinity of a driver's seat. Observing the displayed map enables the driver to verify the present location of the vehicle and to obtain information regarding a route from the present location to another location. The display 12 is provided with a touch switch 11 that corresponds to the display of function buttons. The operations described above are executed based upon signals entered by touching the buttons. Input signal generating means, comprising the buttons and the touch switch, defines an input section, although a detailed description thereof is omitted as such is known to one skilled in the art.

The present-position sensing unit, or sensor, 2 has a GPS receiver 21 which makes use of the Global Positioning System (GPS), a beacon receiver 22, a data transceiver 23 for receiving a GP correction signal utilizing a cellular phone or FM multiplex signal, an absolute direction sensor 24 made up of a geomagnetic sensor or similar sensor, a relative direction sensor 25 made up of a wheel turn sensor, a steering sensor, or a gyro, and a distance sensor 26 for detecting the distance traveled from the number of revolutions of wheels.

The information storage device 3 is an external storage device with a program and data for navigation stored in it, typically, a CD-ROM. The program comprises a map drawing section, a route search section, a route guidance section, a present-position calculation section, and a designation setting operation control section, and further includes an application section for executing navigation signal output processing, an OS section and other necessary operating sections. Also stored in the external device are a program for performing route search and other processing, a program for performing the display output control needed for providing route guidance and the voice output control needed for providing voice guidance, and the data needed therefor, and the display information data needed for route guidance and map display. These data are composed of files, such as map data, search data, guidance data, map matching data, and destination data, in which all the data needed for a navigation system are stored.

The central processing unit 4 includes a CPU 40 for executing various operations, a flash memory 41 into which the programs are loaded from the CD-ROM in the information storage device 3, a ROM 42 having therein a program (program loading means) for performing program checking and updating for the flash memory 41, a RAM 43 for provisionally storing the retrieved route guidance information based on coordinates of the preset destination, road names, and code numbers, and data that are being used, an image memory 44 in which image data used to produce screen displays are stored, an image processor 45 for fetching image data from the image memory 44 on the basis of a display output control signal from the CPU 40 and then subjecting it to image processing for screen displays, a voice processor 46 for compositing voice, phrases, single sentences and sounds read out of the information storage device 3 on the basis of a voice output control signal from the CPU into analog signals and then delivering them to the speaker 16, a communication interface 47 for exchanging input/output data by communication, a sensor input interface 48 for accepting sensor signals from the present-position sensing device 2, and a clock 49 for entering date and time into internal dialog information. Here, route guidance is provided to the driver via screen displays and voice output, and the driver may select whether voice output is produced.

Figure 4:
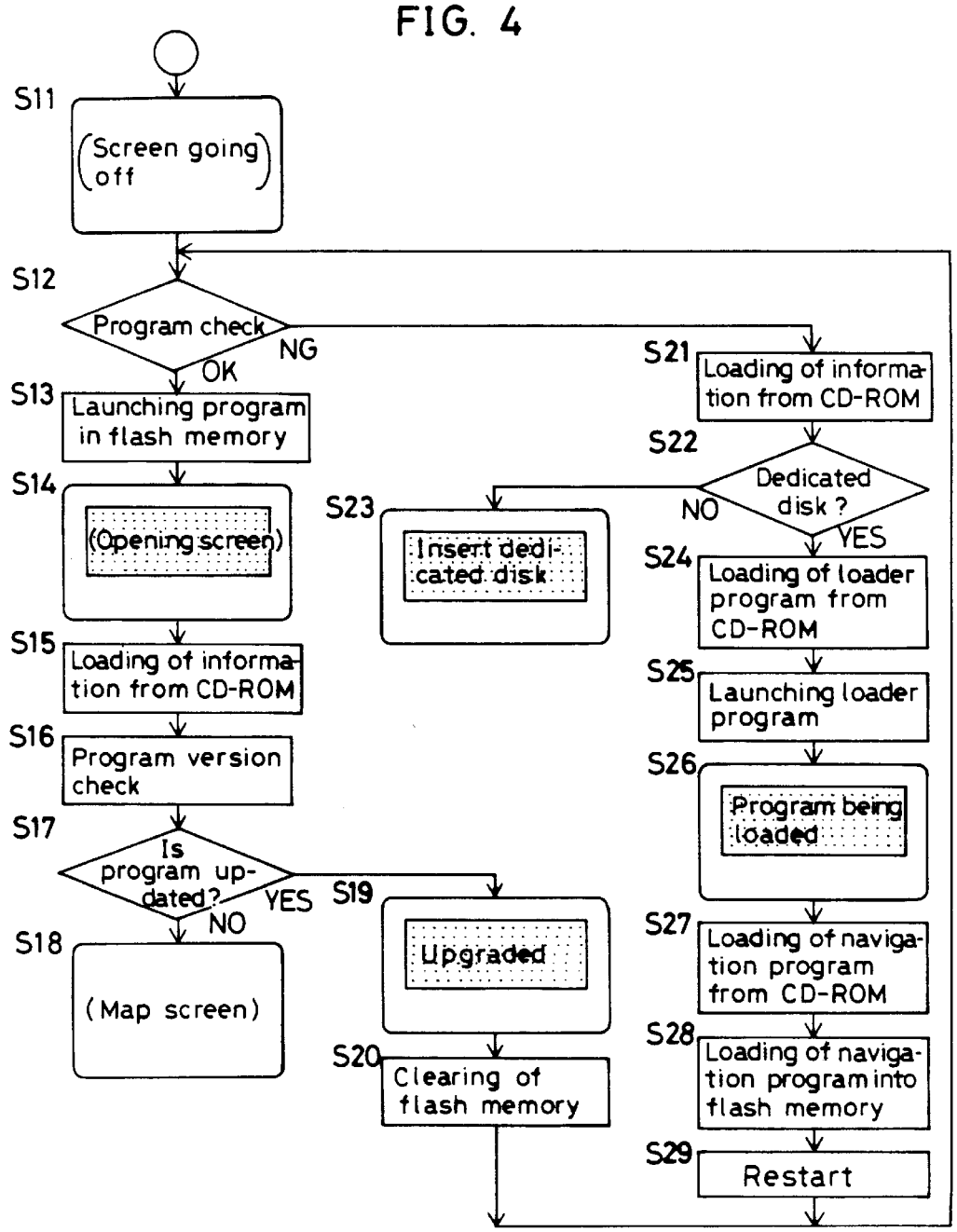
FIG. 4 is a block diagram illustrating the flow of processing for program loading.

As described above, the navigation system according to the invention contains a built-in flash memory 41 of relative large capacity which loads programs from the external storage device or CD-ROM into memory, and a built-in ROM 42 of small capacity which has a CD startup or launching program (program loading means) stored therein. The flash memory 41 is a nonvolatile memory means designed to retain the stored information intact even upon the power going off. In launching the CD, the program of the program loading means, or ROM 42, is started to check the programs stored in the flash memory 41, thereby loading disk management information and other necessary data from the CD-ROM of the information storage device 3 into memory. The program-loading (or updating) processing is conducted while this information and the state of the flash memory 41 are being judged. This processing will now be explained with reference to FIG. 4.

With the power turned on, while the screen remains off (Step S11), the program is checked as to determine whether it is normally loaded in the flash memory (Step S12). If the answer is "OK", the program stored in the flash memory is started or launched (Step S13) to allow an opening screen to appear (Step S14). Then, the disk management information is loaded from the CD-ROM into memory (Step S15) to compare the program version number of the CD-ROM with the program version number stored in the flash memory 41 (Step S16). Based on the comparison of these program versions, a judgment is made whether the program in the flash memory 41 is to be updated (Step S17). That is, if the program version of the CD-ROM is not an upgrade, with respect to that of the flash memory, the program of the flash memory is driven without being updated to display a map screen (Step S18). However, if the program version of the CD-ROM is an upgrade, the upgraded screen is allowed to appear (Step S19), the flash memory is cleared (Step S20), and the system returns to Step S12.

If the answer is "NG" at Step S12, the disk management information is loaded from the CD-ROM into the flash memory 41 (Step S21) to examine whether it is a dedicated disk, i.e. a navigation system disk, (Step S22). If it is not a dedicated disk, then a guide message "INSERT A DEDICATED DISK" is displayed on the screen (Step S23). If it is a dedicated disk, the loader program is loaded from the CD-ROM into the flash memory 41 (Step S24) to start up the loader program (Step S25). Then, while a message "PROGRAM IS BEING LOADED" is displayed (Step S26), the navigation program is loaded (Step S27) from the CD-ROM into the flash memory 41 (Step S28), so that the system can be restarted (Step S29) and brought back to Step S12. Where the program is thus properly loaded in the flash memory 41, the system can always be operated with the latest version of the program by updating the program in the flash memory but without loading programs each time a CD-ROM is launched. This is true even when compatible CD-ROMs are set in the system.

Figure 5:
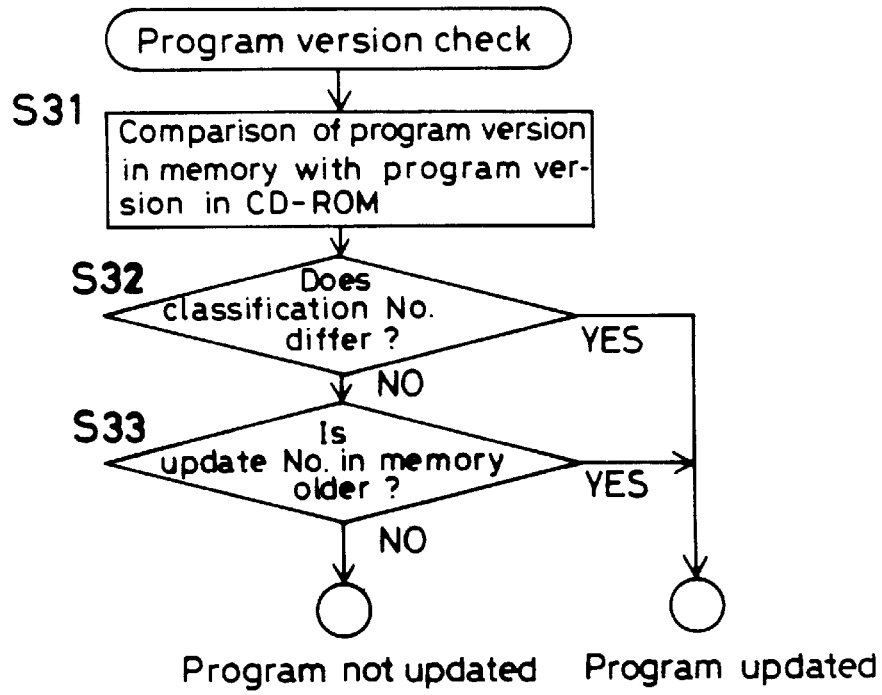
FIG. 5 is a block diagram illustrating the flow of processing for program version checking.

At the version checking Steps S16, S17, as shown in greater detail in FIG. 5, the program versions in the flash memory 41 and CD-ROM are compared with each other (Step S31) to examine whether the classification numbers are different from each other (Step S32). If no difference is found between the classification numbers, it is then checked whether the update number in the flash memory 41 is older than that in the CD-ROM (Step S33). If there is a difference between the classification numbers or if the update number in the flash memory is older than that in the CD-ROM, although there is no difference between the classification numbers, the program in the flash memory 41 is determined to be out of date, that is, is necessary to update the version in the flash memory 41. If there is no difference between the classification numbers and the update number in the flash memory is not older than that in the CD-ROM, on the other hand, the program in the flash memory 41 is determined to be the current version and no update is required.

Figure 6:
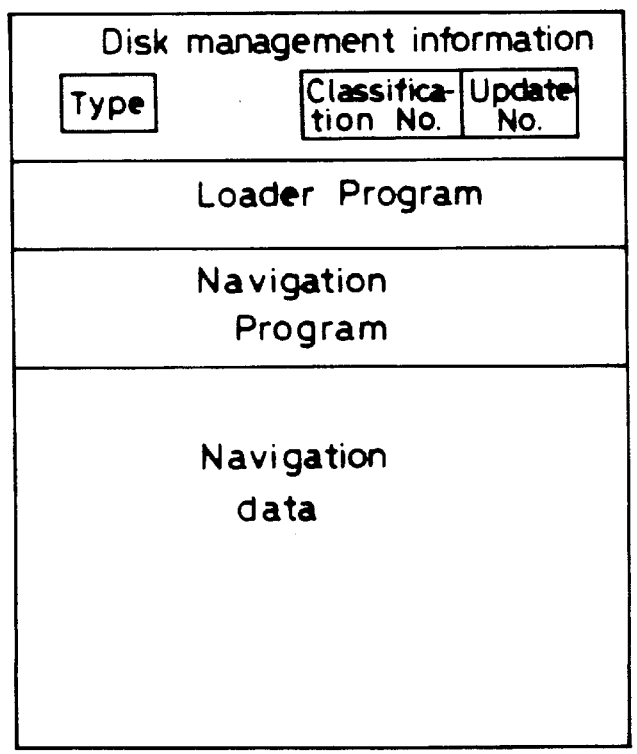
FIG. 6 shows an exemplary structure of CD-ROM data.

The CD-ROM data structure is made up of disk management information, loader program, and navigation program and data, as conceptually shown in FIG. 6. The disk management information contains information on the type of CD-ROM (such as, it is for navigation, or contains music or video, and, if it is for navigation purposes, whether for local or national use, or provides information on sight-seeing and leisure) and on the genre, e.g., the classification number and the update number. If the navigation CD-ROM selected is for local purposes, a district can then be determined from coordinates of its area. As already noted, the navigation programs are an application section composed of at least a map drawing subsection, a route search subsection, a route guidance subsection, a present-position calculation subsection, and a destination presetting control subsection, and a program for processing navigation output signals. The CD-ROM also contains an OS section having the loader program and a navigation data section containing at least map data, search data, guidance data, map matching data, and destination data.

When a CD changer is used in combination with the program loading means, it is possible to achieve automatic CD exchanges as per exchange instructions. With a specific CD selected, the disk management information (disk label) is loaded from the CD into memory to judge the content of that disk management information to thereby select the CD to be driven. If the thus selected CD is a navigation CD, the aforesaid program memory is updated upon identification of the classification number and update (version) number of the selected CD.

The use of such a CD changer causes an exchange of CDs to occur more frequently than would be the case with a single CD player. For this reason, especially when the invention is applied to a changer type of equipment involving frequent exchanges of CDs, effects due to the aforesaid reduction in the CD loading time are of great significance. It is to be noted, by the way, that several types of about six to eight types of navigation, music and video CDs, that is mixed types, are selectively used and driven. Even in this case, only the navigation CD will be run by loading the disk management information from it into memory. Furthermore, it is possible to update the program smoothly. The program in the flash memory 41 is designed such that it can be updated only when specific conditions are satisfied in terms of classification and version. The result is there is a reduction in the length of time needed to launch the CD.

A loader program is in itself designed to be stored as program loading means in the system so that the system itself has the necessary program required for CD loading. However, the program may be only an address for a given region on the CD to initiate the program. In the invention, too, the CD may have a part of the loader program assigned thereto as a program loading means.

By use of such a structure, it is possible to reduce the memory capacity needed to store extravagant programs in the system. Usually, the function for drawing images that is indicated on the display while the program is being updated is stored in the system as the load program. However, by allowing the CD to have this function it is possible to provide various images on the display. Images displayed so far in the art are just simple messages, such as "THE VERSION IS BEING UPGRADED", because of limited memory capacity. According to the invention, however, images, such as landscape pictures or whatever is appropriate can be processed, while the version is being upgraded, without causing any memory capacity increase on the system. The loader program is designed to work for launching (updating) alone; in other words, it is a not-always-needed program. Thus, the loader program is stored on the CD-ROM and loaded into the RAM for launching the system. It can be erased thereafter, i.e. launching the program, so that the memory capacity of the system can be decreased.

According to the invention, a CD-ROM may have a plurality of programs stored thereon which can run on a plurality of systems. Upon the CD-ROM being used on one system, the corresponding program may be loaded into the flash memory. In what follows, reference will be made to a specific embodiment of the invention where a common CD-ROM can be used on a plurality of systems.

Figure 7A:
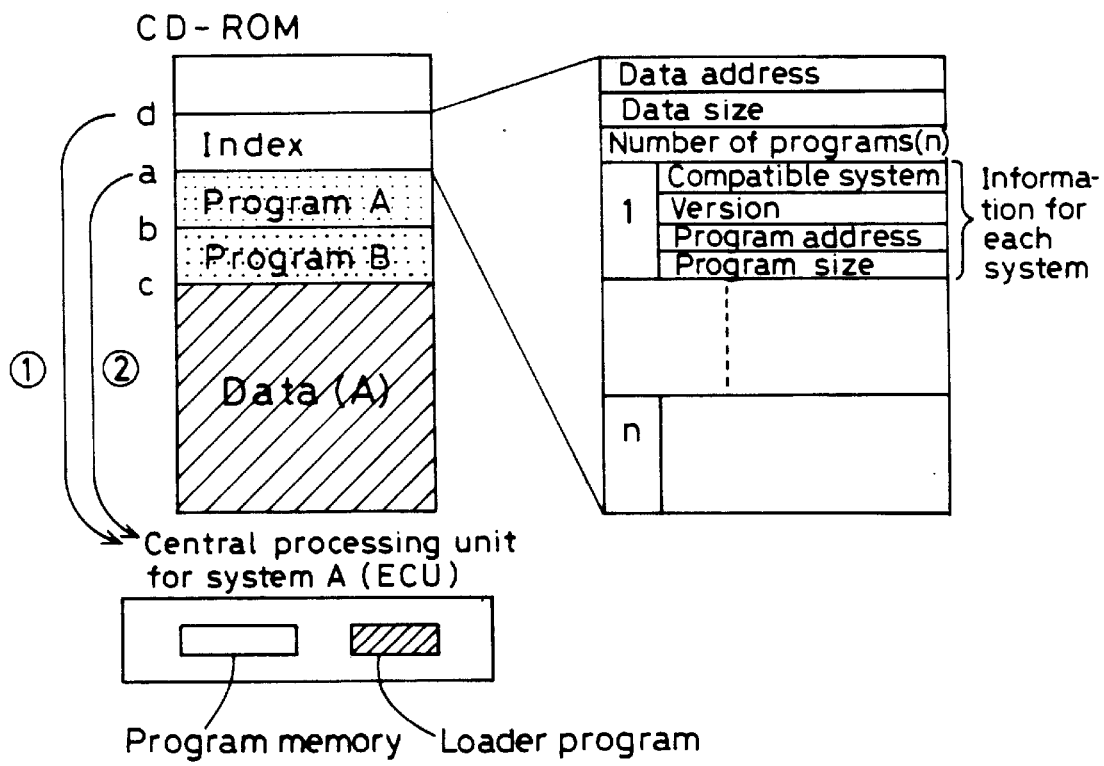
FIGS. 7A–7B show the relationship between one exemplary CD-ROM structure and a loader program provided in a central processing unit.
Figure 7B:
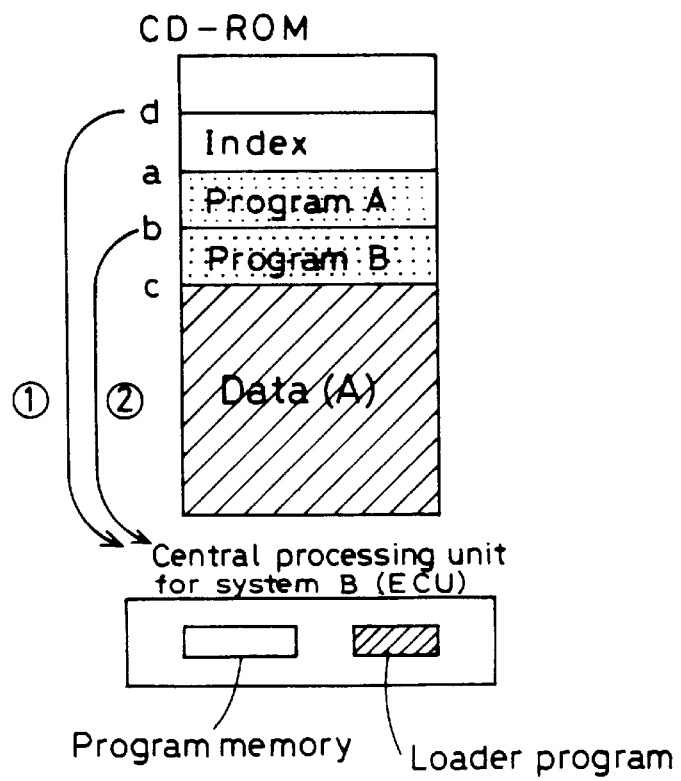

In a CD-ROM (information storage device) shown in FIGS. 7A and 7B, an address space is allocated such that an index is stored from an address d, a program A is stored from an address a, a program B is stored from an address b, and data (A) is stored from an address c. The index is made up of a data address, data size, the number of programs, and program address information for each system. Then, the program address information for each system is made up of information about the corresponding system (e.g., A, B . . . ), version, program address, and program size. In short, this index corresponds to the disk management information explained with reference to FIG. 6, and the corresponding system corresponds likewise to the classification number. The program A runs on a central processor of the corresponding system A upon being loaded therein, while the program B runs on a central processor of the corresponding system B upon being loaded therein. For both of the programs, data (A) is commonly used. In other words, the program B that can run on the system B uses the data (A) to enable navigation which was created for system A but is usable with not only system A but also system B as well.

Thus, if, corresponding to the CD-ROM, the loader program on the central processor (ECU) of the system A has a function of loading the index therein to recognize the address and size of the program A as the program loading means, then the program A is loaded into program memory (the flash memory 41 shown in FIG. 3) based upon the index loaded therein as shown in FIG. 7A. Thus, it is possible to implement route search or route guidance using the data (A) with the system A. Likewise, if the loader program on the central processor of the system B has a function of loading the index therein to recognize the address and size of the address B as program loading means, then the program B is loaded into program memory (the flash memory 41 shown in FIG. 3) upon the index loaded therein as shown in FIG. 7B. Thus, it is possible to implement route search or route guidance by the running of the program B on system B, using the data (A) created for system A. It follows that the CD-ROM can be used in common to both systems A and B. Accordingly, if the CD-ROM made up of the program A, the program B and data (B) for the system B is used on the central processor of the system A, it is then possible to implement route search or route guidance by the running of the program A on system A, using the data (B) created for system B.

Referring here to the processing performed on such a loader program as mentioned above, the CD-ROM is set in place as shown in FIG. 8 (Step S41). When the CD-ROM is set in place, the index is loaded into the RAM 43 from the given address d (Step S42) to enable retrieval of a system on the basis of the program address for each system (Step S43). If there is a corresponding system program, i.e. a program corresponding to the system into which the CD-ROM is set up, on the CD-ROM (e.g., A) is then determined (Step S44). If a corresponding system is not found, a message to this effect is displayed on the screen (Step S45). If the corresponding system is found, then the version of the program for that system is compared with the program in the flash memory 41 (Step S46). If the version of the program is identical or lower in level than that in the flash memory 41, then the program A in the flash memory 41 is immediately launched (Step S49). When the version of the program on the CD-ROM is at a higher level, however, the address, size and version of the program are stored in the flash memory 41 (Step S47), and the program A is loaded from the given address a into the flash memory 41 (Step S48). Thereupon, the program A in the flash memory 41 is launched (Step S49). In this manner, it is possible to dispense with steps S47 and S48 and, hence, achieve the prompt launching of the system program when the version of the system program on the CD-ROM is at the same level or at a lower level than that in the flash memory 41.

Figure 9A:
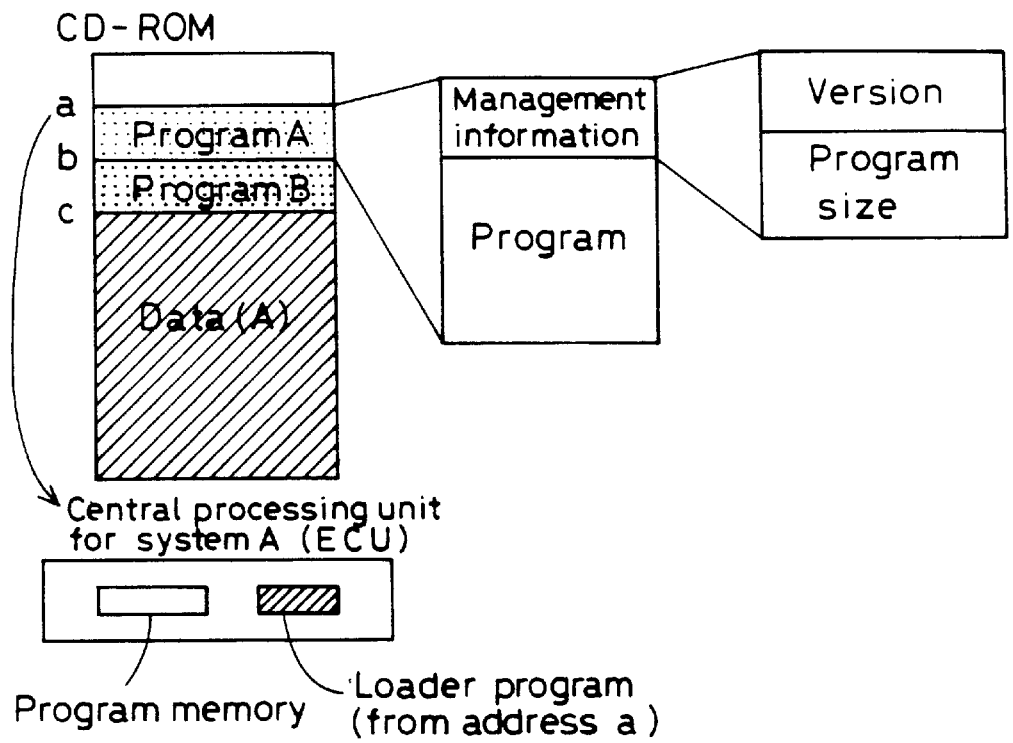
FIGS. 9A–9B show the relationship between another exemplary CD-ROM structure and a loader program provided in a central processing unit.
Figure 9B:
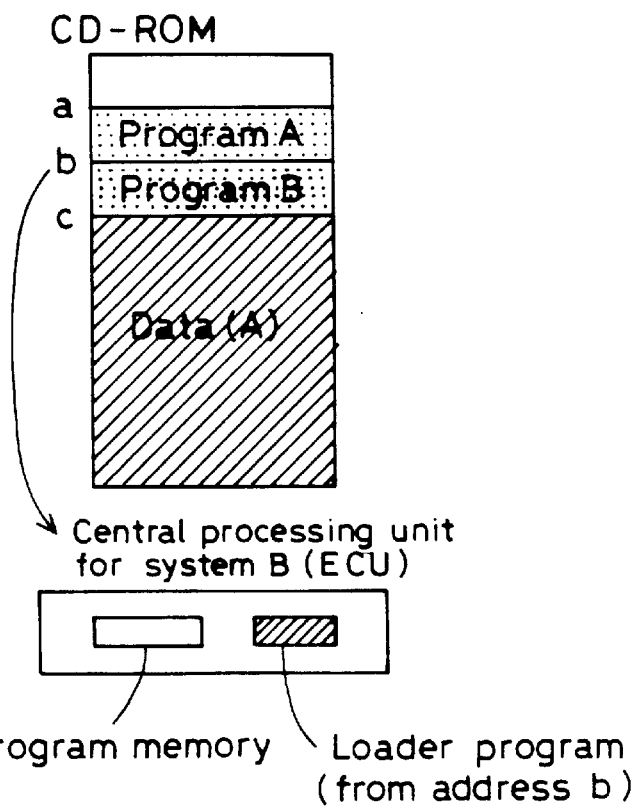
Figure 10A:
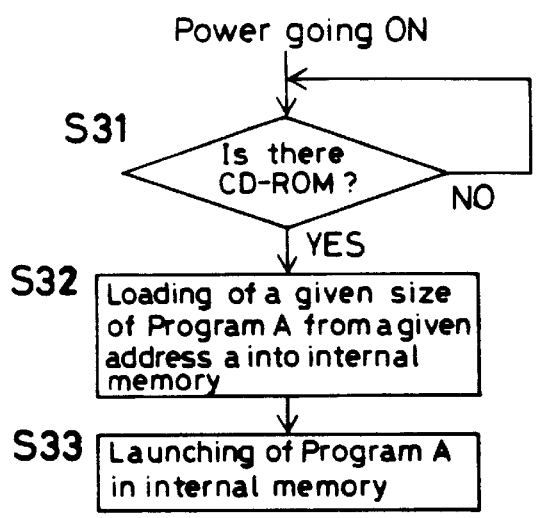
FIGS. 10A–10B are block diagrams illustrating the flow of processing on a loader program.

Shown in FIGS. 9A and 9B is an exemplary structure of a CD-ROM having no index but containing programs A and B, each having a version and program size in the form of management information. For use of such a CD-ROM, the central processing unit 40 has a loader program with a loading address preset therein. For instance, the loader program of the central processing unit 40 of a system A loads the program A from an address a, as shown in FIG. 9A, into the flash memory 41. In this case, as shown in FIG. 10A, management information is first loaded into the flash, or program memory, and the program is subsequently loaded into the flash memory 41 according to the program size contained in the management information, so that the program A can be launched for navigation using data (A) of system A.

Figure 10B:
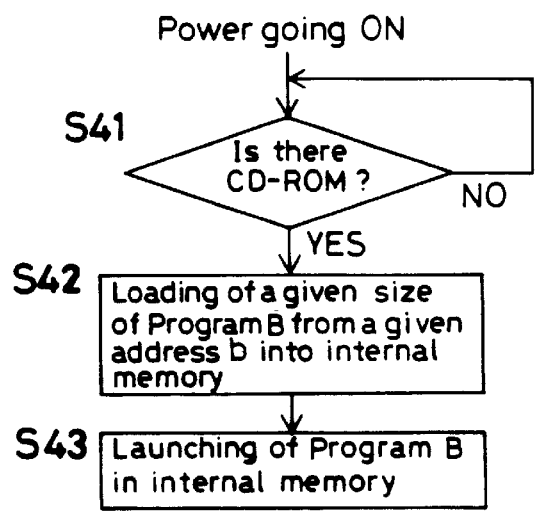

A central processing unit 40 of a system B has a similar loader program for loading a program B from an address b, as shown in FIG. 9B, into the flash memory 41. In this case, the management information of Program B is first loaded into the flash memory 41, and the program of Program B is subsequently loaded into the flash memory 41 according to the program size contained in the management information, as shown in FIG. 10B, so that program B can be launched for navigation using data (A) created for system A. In such a system whether the program is to be updated may be decided by the comparison of the version in the management information with that in the flash memory 41 in a manner similar to that previously discussed.

Figure 11A:
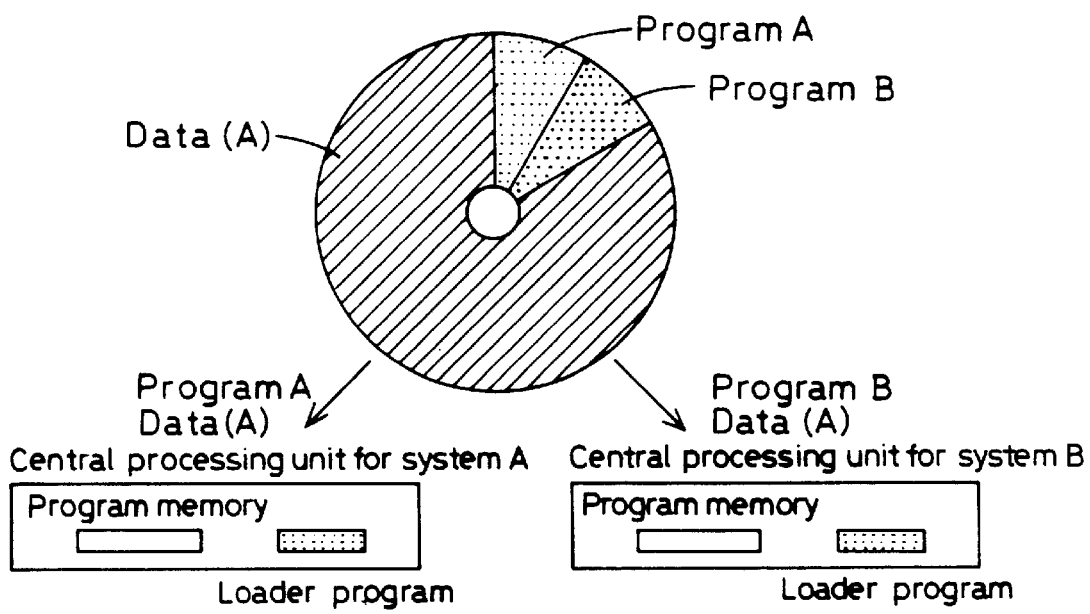
FIGS. 11A–11B are views showing how CD-ROMs and central processing units are mutually used.
Figure 11B:
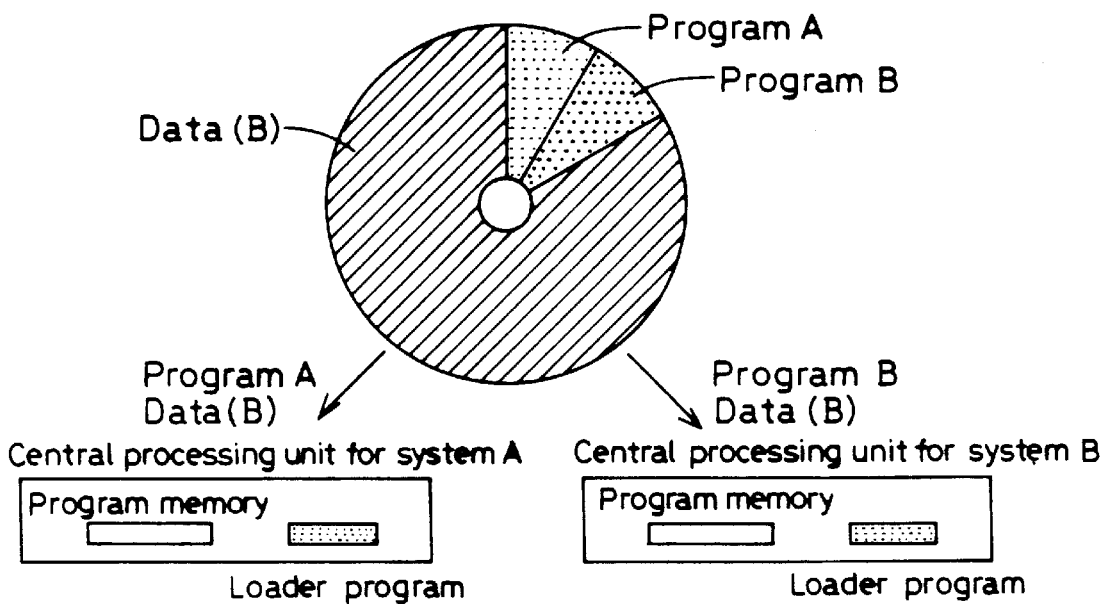

FIGS. 11A and 11B show how CD-ROMs and central processing units of systems A and B can be mutually used with each other. FIG. 11A illustrates an example of a CD-ROM storing data (A) created for system A as well as a program A for running on the central processing unit of system A and a program B for running on the central processing unit of system B, and FIG. 11B shows an example of a CD-ROM storing data (B) created for system B as well as a program A for running on the central processing unit of system A and a program B for running on the central processing unit of system B.

The central processing unit includes a loader program and program memory, the loader program serving as program loading means for loading a system compatible program from the CD-ROM into the program memory. Stored in the CD-ROM are programs A and B for systems A and B, which are composed of an application section comprising a map drawing subsection, a route search subsection, a route guidance subsection, a present-position calculation subsection and a destination setting control subsection and an OS section, and all of the data comprising files on a collection of data commonly used with these programs, such as map data, search data, guidance data, map matching data, and destination data needed to run navigation systems. Thus, a single CD-ROM can be commonly used on different navigation systems, so that their availability and flexibility can be enhanced.

It is to be noted that the invention is not limited to the aforesaid embodiments, and so many modifications or changes may be made thereto. For instance, the aforesaid embodiments make use of CD-ROMs as information (external) storage devices, but any desired detachable small information storage media, typically, memory cards and optical cards may be used as well. Programs compatible with different navigation systems are provided by a combined application and OS section set. This set may be divided into a common application section and a plurality of OS sections largely dependent on hardware, with which a plurality of programs are bundled. The aforesaid embodiments have been described with reference to navigation systems for route guidance. However, it is to be understood that the invention may be applied as well to a navigation system having no route guidance function, such as a location navigation system, and other systems, such as a map information display system.

Figure 12A:
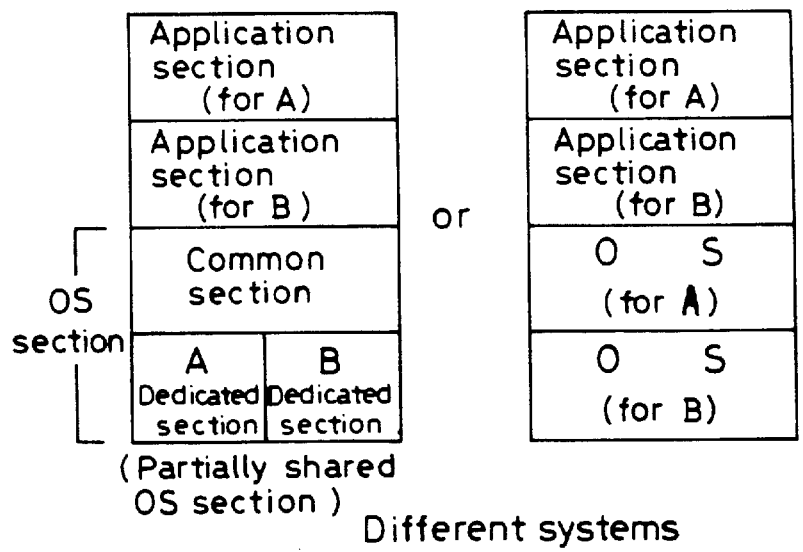
FIGS. 12A–12B illustrate exemplary combinations of applications and operating systems stored in a CD-ROM.
Figure 12B:
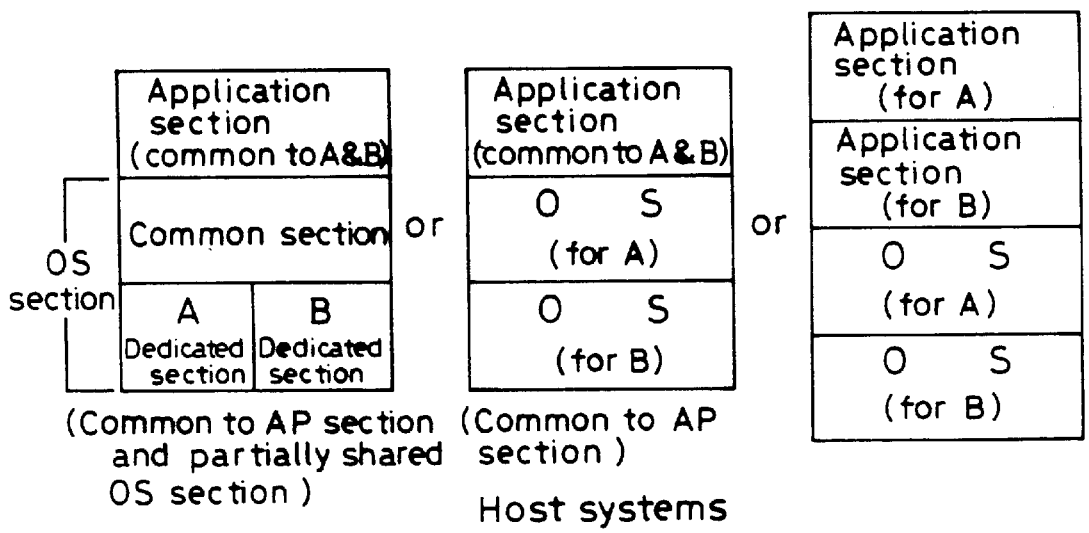

Reference will now be made to some modified combinations of application and OS sections to be stored in a CD-ROM, which are available for different systems. As shown in FIG. 12A, an OS section may be stored in the CD-ROM such that it is divided into not only a subsection commonly available for both of the systems A and B, but also subsections dedicated to each of the systems A and B. This enables the storage capacity to be smaller than would be possible in the case of separately provided OS sections. For application to different host systems, e.g., for application to models A and B of a certain host system, as shown in FIG. 12B, both application and OS sections may be divided into subsections dedicated to each of the systems A and B. Alternatively, the application section may be dedicated in common to both of the systems A and B. Still alternatively, the OS section may be divided into a subsection common to both of the systems A and B, and subsections dedicated to each of the systems A and B, respectively. It follows that combinations are possible and follow from the above description.

In the aforesaid embodiments, a flash memory (a flash EEPROM) has been used as nonvolatile memory means (PROM) for storing programs therein. However, other desired storage means, e.g., EPROMs and EEPROMs may be used as well, if they can write over programs for specific purposes. The nonvolatile storage means used need not always be ROMS. RAMs may also be used if they are nonvolatile.

In the invention, EEPROMs or flash EEPROMs or electrically writable-over nonvolatile storage means are used so that programs can be written over while the storage means remains fixed in the system proper. This enables programs to be written over very easily. If the CD is allowed to have some part of the loader program as embodied above, then the updating of the program can be executed in byte units, in given block units or at full bits, because the updating range can be assigned thereto in the form of a program. Therefore, such as when a part of programs is changed, that part alone can be erased and updated so that the updating time of programs can be shortened.

As can be appreciated from the foregoing, the invention dispenses with extravagant updating of the CD-ROM programs and so enables the CD launching time to be shortened, because for programs to be loaded from a CD-ROM, containing navigation programs and data, into the nonvolatile storage means, such as a flash memory, it is only necessary when the program version of the CD-ROM is found by comparison to be higher than that of in the storage means that the programs and data found in the storage means are updated.

Even when use is made of a CD-ROM with a combined navigation program and map data set stored in it, the stored information older than that in the flash memory in terms of the programs stored, the flash memory programs are used without being updated if the map data is compatible. Thus, when either local or national CDs are used, navigation is achieved using the latest program, if the map data is compatible. Even when equipment involving frequent exchanges of CDs, such as a CD changer is used, the number of updatings (loadings) is reduced.

The loader program loads the updated navigation program into the flash memory. Therefore it is not needed while the navigation program is running. As a result, it can be stored in the CD-ROM, and is also used to load map data therefrom into the map data memory, which is designed to run on the navigation program alone, so that the memory (ROM) capacity of the system can be saved. Consequently, it is possible to change the design of a screen display showing how the program is being loaded into memory for each CD-ROM without any increase in the memory capacity of the system.

In addition, if a navigation program compatible with a plurality of different systems, map information for a route search and route guidance, and other route information are stored in an information storage device, a single CD-ROM (an information storage device) is then commonly available for systems having given navigation programs stored therein. Moreover, since a CD-ROM having given navigation programs stored therein can be used for other systems with no replacement of the central processing unit, a variety of navigation services can be rendered to users.

In some cases, even central processing units (ECUS) produced by the same maker should be modified to better their function and performance. Even in such cases, the invention makes it possible to improve productivity because what is needed is only to produce a single type of CD-ROMS, whereas it was so far required to produce separate types of CD-ROMs.

What we claim is:

1. A navigation system designed to perform a route search to a destination and provide route guidance, comprising:

an external storage device in which navigation data and a program for performing the route search and the route guidance have been stored; and a central processing unit for performing the route search and the route guidance based on said navigation data by executing said program, wherein said central processing unit comprises nonvolatile memory means for storing the program, comparison means for comparing version data of a program stored in said nonvolatile memory means with version data of the program stored in said external storage device, and program reading means for reading said program from said external storage device and storing said program to said nonvolatile memory means, wherein it is judged whether to read part or all of the program stored in said external storage device and to store said program to said nonvolatile memory means based on a result of a comparison by said comparison means, and the program stored in said nonvolatile memory means is executed using the navigation data stored in said external storage device.

2. The navigation system according to claim 1, wherein the program reading means, when the program stored in said external storage device is to carry out navigation and is different from the program stored in the nonvolatile memory means, loads the first-mentioned program from the external storage device into the nonvolatile memory means to update the program stored in the nonvolatile memory means.

3. The navigation system according to claim 1, wherein the program reading means loads the version data from the external storage means into memory, so that if the version data is to perform navigation processing, the version data is compared with the version data of the prior program stored in the nonvolatile memory means to judge whether to update the nonvolatile memory means.

4. The navigation system according to claim 3, wherein the version data comprises a program update number, and the program reading means is designed to check the program update number, so that when the update number is older in the nonvolatile memory means than in the external storage device, the nonvolatile memory means is updated.

5. The navigation system according to claim 3, wherein the version data comprises a program classification number, and the program reading means is designed to check the program classification number, so that when the classification number differs between the external storage device and the nonvolatile memory means, the nonvolatile memory means is updated.

6. The navigation system according to claim 1, wherein the external storage device stores a loader program, and a navigation program and data, the program reading means loads the loader program from the external storage device into memory so that the navigation program is updated by the loader program.

7. The navigation system according to claim 1, wherein the external storage device comprises:

a plurality of disks; and a disk changer for making an exchange of the plurality of disks in response to a selection signal for loading into memory.

8. The navigation system according to claim 7, wherein the external storage device contains a plurality of programs for providing route search and route guidance.

9. The navigation system according to claim 8, wherein the plurality of programs are compatible with different types of navigation systems, and the program loading means retrieves a program compatible with a given corresponding type of navigation system from the external storage device for storage into memory.

10. The navigation system according to claim 9, wherein the external storage device has a collection of index information including information about a given corresponding type of navigation system, and a program address and program size thereof, and the program loading means retrieves the corresponding type of navigation system from the index information for loading a corresponding program into memory.

11. The navigation system according to claim 9, wherein the program reading means of the central processing unit compares the version data of a prior program stored in the nonvolatile memory means and the version data of the program stored in the external storage device, so that only when there is a difference therebetween, the program is stored into the nonvolatile memory means.

12. The navigation system according to claim 8, wherein the external storage device has an address specific to each corresponding type of navigation system assigned to the plurality of programs, and the program reading means has a preset loading address specific to the corresponding type of navigation system and loads a program compatible with the corresponding type of navigation system from the external storage device into memory.

13. The navigation system according to claim 8, wherein the navigation data includes a collection of map data, search data, guidance data, and destination data.

14. The navigation system according to claim 8, the plurality of programs include a map drawing program, a route search program, a route guidance program, a present-position calculation program, and a destination setting control program.

15. The navigation system according to claim 8, wherein the plurality of programs have programs differing between the types of navigation systems and a program common to the types of navigation systems stored therein along with address information for each program.

16. A memory medium used on a navigation system designed to perform a route search to a preset destination and provide route guidance, wherein a plurality of programs for performing a route search to the preset destination and for providing route guidance on the route thus searched and navigation data shared in said plurality of programs are stored, said plurality of programs being compatible with different types of navigation systems, each of said plurality of programs having an update number and classification number corresponding to a type of navigation system.

17. The memory medium according to claim 16, wherein the navigation data includes a collection of map data, search data, guidance data, and destination data.

18. The memory medium according to claim 16, wherein the plurality of programs include a map drawing program, a route search program, a route guidance program, a present-position calculation program, and a destination setting control program.

19. The navigation system according to claim 16, wherein the plurality of programs have programs differing between the types of navigation systems and a program common to the types of navigation systems stored therein along with address information for each program.

* * * * *